(12) United States Patent
Cheng et al.

(10) Patent No.: US 7,618,199 B1
(45) Date of Patent: Nov. 17, 2009

(54) OPTICAL COMMUNICATION APPARATUS AND OPTICAL TRANSCEIVER THEREOF

(75) Inventors: Yung-Yuan Cheng, Taoyuan Hsien (TW); Chiung-Hung Wang, Taoyuan Hsien (TW); Chih-Hsiao Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/514,837

(22) Filed: Sep. 5, 2006

(30) Foreign Application Priority Data

Oct. 7, 2005 (TW) .............................. 94135037 A
Jul. 28, 2006 (TW) .............................. 95213285 U

(51) Int. Cl.
*G02B 6/36* (2006.01)

(52) U.S. Cl. .............................. 385/88; 385/53; 385/89; 385/90; 385/91; 385/92; 385/93; 385/94

(58) Field of Classification Search ............. 385/88–94, 385/53
See application file for complete search history.

(56) References Cited

U.S. PATENT DOCUMENTS

| | | | |
|---|---|---|---|
| 5,129,024 A * | 7/1992 | Honma ........................ | 385/76 |
| 6,973,891 B1 * | 12/2005 | Warner ........................ | 114/197 |
| 2002/0142634 A1 * | 10/2002 | Poplawski et al. ............ | 439/98 |
| 2003/0194190 A1 * | 10/2003 | Huang .......................... | 385/92 |
| 2005/0226626 A1 * | 10/2005 | Zhang et al. ................. | 398/135 |

* cited by examiner

*Primary Examiner*—Frank G Font
*Assistant Examiner*—Jerry Blevins
(74) *Attorney, Agent, or Firm*—Birch, Stewart, Kolasch & Birch, LLP

(57) ABSTRACT

An optical transceiver disposed within a cage includes a main body, a handle and a sliding element. The handle is coupled with the main body. The sliding element is secured to the handle and has an arm which is slidably disposed in a track of the main body. When the handle is rotated, the sliding element slides along the track.

21 Claims, 8 Drawing Sheets

OPTICAL COMMUNICATION APPARATUS AND OPTICAL TRANSCEIVER THEREOF

This non-provisional application claims priority under U.S.C. § 119(A) on Patent Application No(S). 094135037, filed in Taiwan, Republic of China on Oct. 7, 2005, and Patent Application No(S). 095213285, filed in Taiwan, Republic of China on Jul. 28, 2006, the entire contents of which are hereby incorporated by reference.

BACKGROUND OF THE INVENTION

1. Field of Invention

The invention relates to a communication apparatus, and in particular to an optical communication apparatus and an optical transceiver thereof.

2. Related Art

Due to rapid development of the computer system and the related periphery devices applied thereto, it is a trend to increase the information transmission speed for performing highly complex operations, such as digital signal transmissions and image analysis. Under this demands, the optical fiber is invented for the long-distance or short-distance signal transmissions. Since the optical signals can be transmitted in a higher speed than the electrical signals, the goal of increasing the information transmission speed can be achieved.

A fiber optical communication module has been used to transmit signals between electrical devices. It is composed of an optical transceiver module and a driver/receiver circuitry module. The optical transceiver module usually includes a light emitting device and a light detecting device.

As shown in FIG. 1, a conventional optical communication apparatus 1 includes an optical transceiver 10, which is inserted into a cage 12 of a circuit board 11 for connecting to a connector 13 of the circuit board 11. The whole structure is then installed into a main system such as a router or a computer. In this case, in order to provide the flexibility for the system specifications, the optical transceiver 10 is designed as being flexibly plugged/unplugged to the cage 12. In more details, the optical transceiver 10 has a latch mechanism for locking itself in the cage or for ejecting itself from the cage 12.

As shown in FIG. 2, a latch mechanism 101 of the conventional optical transceiver 10 includes a first sliding arm 102, a second sliding arm 103, and a movable bar 104. The first sliding arm 102 and the second sliding arm 103 are substantially disposed in parallel at two opposite sides of the cage 12. Besides, each of the sliding arms 102 and 103 has a protrusion portion 105 located at one end thereof and an elastic element 106 located therein, respectively. When the movable bar 104 vertically contacts with the sliding arms 102 and 103, the protrusion portion 105 is locked with the elastic chip 121 located at the side surface of the cage 12 and protruded inwardly. Thus, the optical transceiver 10 can be locked within the cage 12. In this case, the elastic elements 106 of the sliding arms 102 and 103 are compressed. In addition, when the movable bar 104 is rotated to release the sliding arms 102 and 103, the optical transceiver 10 is pushed to slide along the direction "X", as shown in FIG. 1, by the restore elasticity of the elastic elements 106 so that the optical transceiver 10 is ejected out of the cage 12.

However, because the conventional latch mechanism 101 needs many components, it results in assembling difficulty and high manufacturing and component managing costs. Moreover, the elastic elements 106 of the latch mechanism 101 may lose their functions due to the elastic fatigue after several times of plugging-in and ejecting actions.

It is therefore an important subject of the invention to provide an optical communication apparatus and an optical transceiver thereof with advantages of simply assembling, low manufacturing and component managing costs and high product reliability.

SUMMARY OF THE INVENTION

In view of the foregoing, the invention provides an optical communication apparatus and an optical transceiver thereof, which has advantages of simple assembly, low manufacturing and component managing costs and high product reliability.

To achieve the above, an optical transceiver of the invention is disposed within a cage and includes a main body, a handle, and a sliding element. In the invention, the handle is coupled with the main body, and the sliding element is secured to the handle. The sliding element has an arm, which is slidably disposed in a track of the main body. When the handle is rotated, the sliding element slides along the track.

To achieve the above, an optical communication apparatus of the invention includes a circuit board, a cage, and an optical transceiver. In the invention, the cage connects to the circuit board, and the optical transceiver is disposed within the cage. The optical transceiver includes a main body, a handle and a sliding element. The handle is coupled with the main body, and the sliding element is secured to the handle. The sliding element has an arm, which is slidably disposed in a track of the main body. Thus, when the handle is rotated, the sliding element slides along the track.

As mentioned above, the optical communication apparatus and optical transceiver of the invention utilize the handle, which is pivotally connected with the main body, to motivate the sliding element for releasing the optical transceiver from the cage. Accordingly, the optical transceiver can be locked in or ejected out of the cage based on the rotation of the handle. In the invention, the invention uses only one handle and one sliding element to hold the optical transceiver in/out the cage. Compared with the prior art, the invention has simpler components, so that the assembling labors and manufacturing and component managing costs can be reduced. In addition, the invention utilizes a mechanism to transform the optical transceiver between the locked state and the released state. Thus, the structure of the invention is more secure, and malfunction due to the elastic fatigue of the conventional elastic element can be prevented. As a result, the reliability of the products is improved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompany drawings, which are given by way of illustration only, and thus are not limitative of the present invention, and wherein.

DETAILED DESCRIPTION OF THE INVENTION

Figure 1:
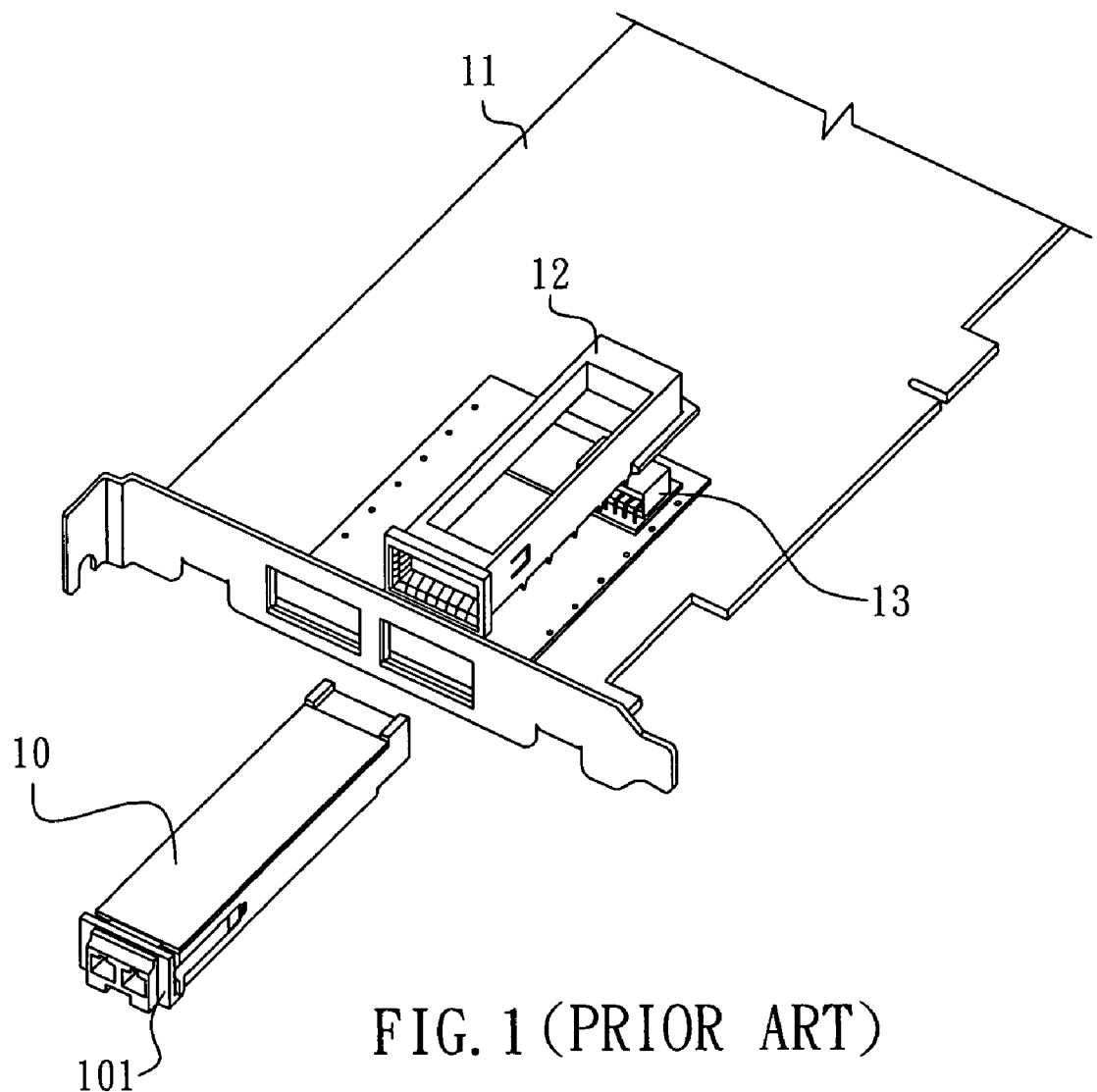
FIG. 1 is a schematic view of the conventional optical communication apparatus.
Figure 2:
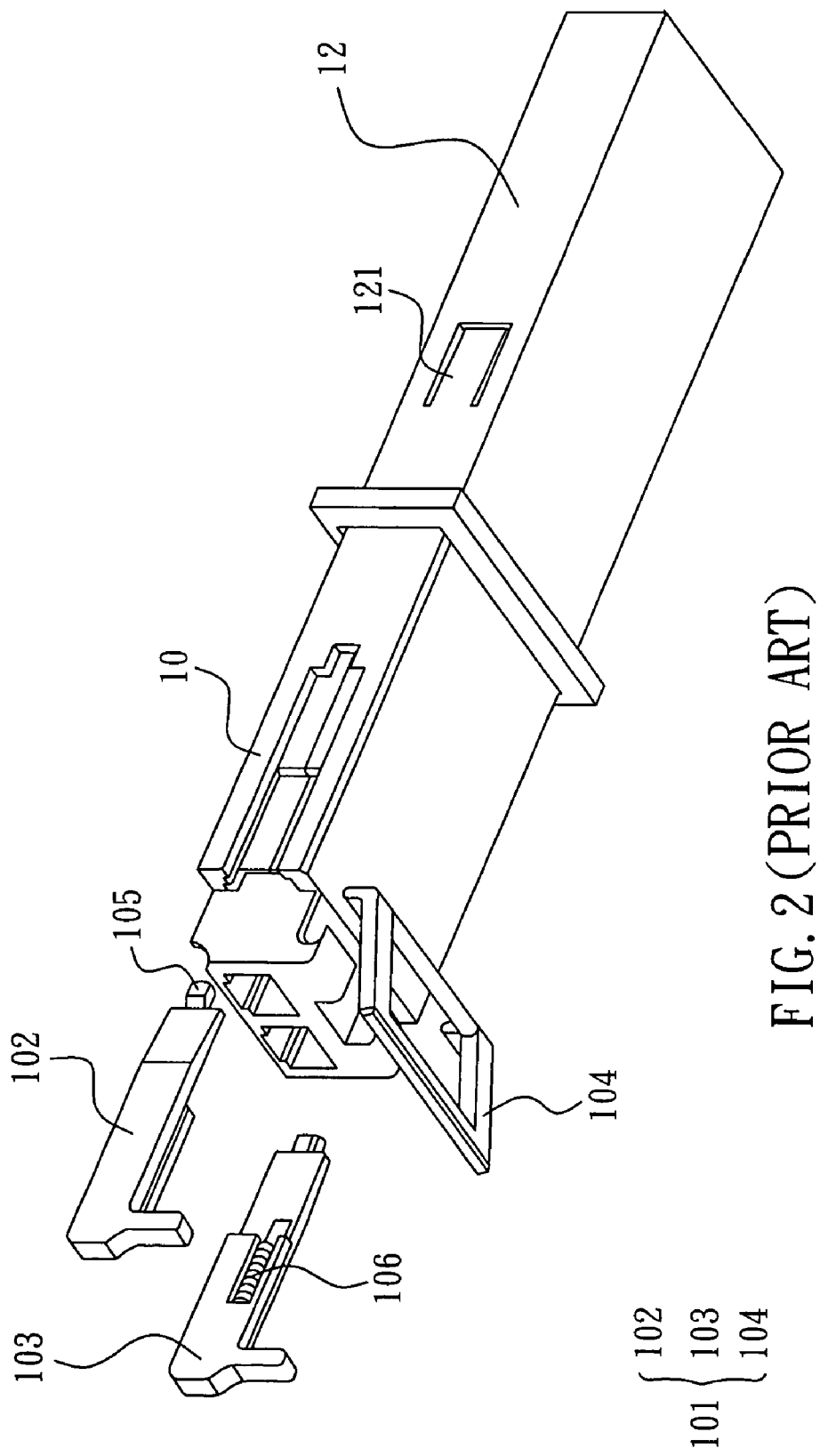
FIG. 2 is a schematic view of the latch mechanism of the conventional optical communication apparatus.
Figure 3:
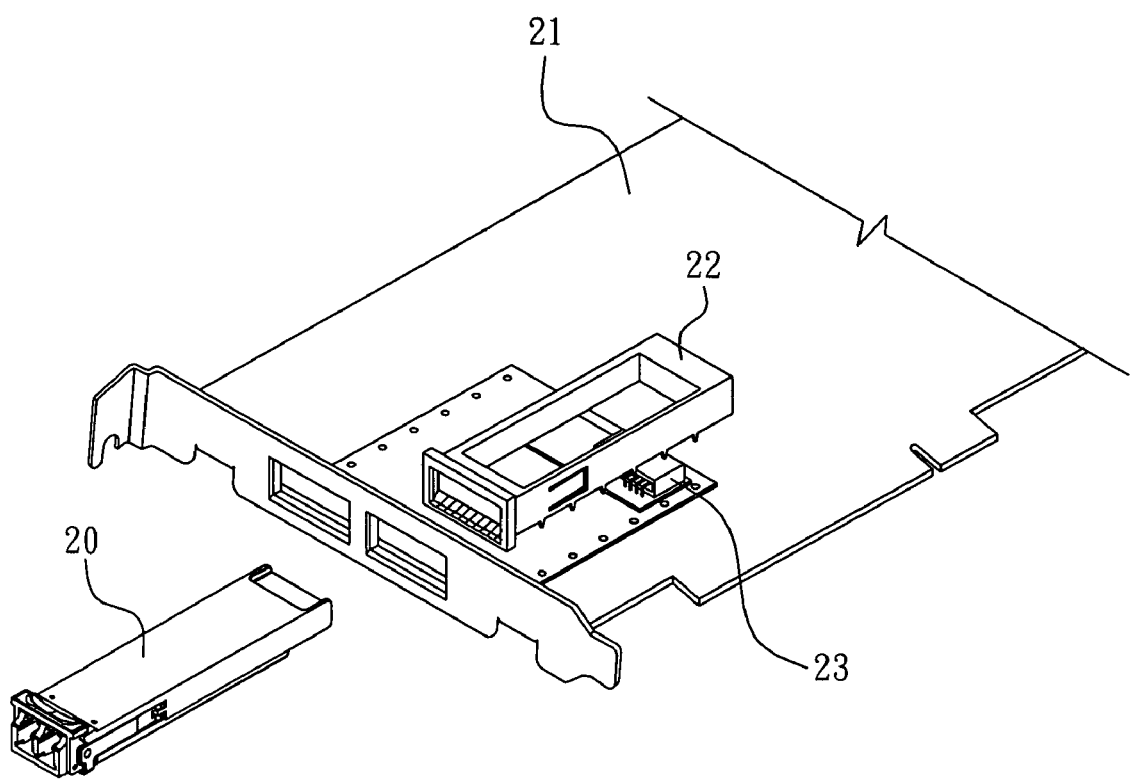
FIG. 3 is a schematic view of an optical communication apparatus according to a preferred embodiment of the invention.

With reference to FIG. 3, an optical communication apparatus 2 according to a preferred embodiment of the invention includes a circuit board 21, a cage 22 and an optical transceiver 20. In the embodiment, the optical communication apparatus 2 is a part of a computer system.

The optical transceiver 20 is disposed within the cage 22, and the cage 22 is connected with the circuit board 21 of the optical communication apparatus 2. In addition, the cage 22 further accommodates a connector 23 electrically connected with the circuit board 21. The optical transceiver 20 is connected to the circuit board 21 through the connector 23. Particularly, the optical transceiver 20 can be flexibly plugged in or unplugged from the cage 22.

Figure 4:
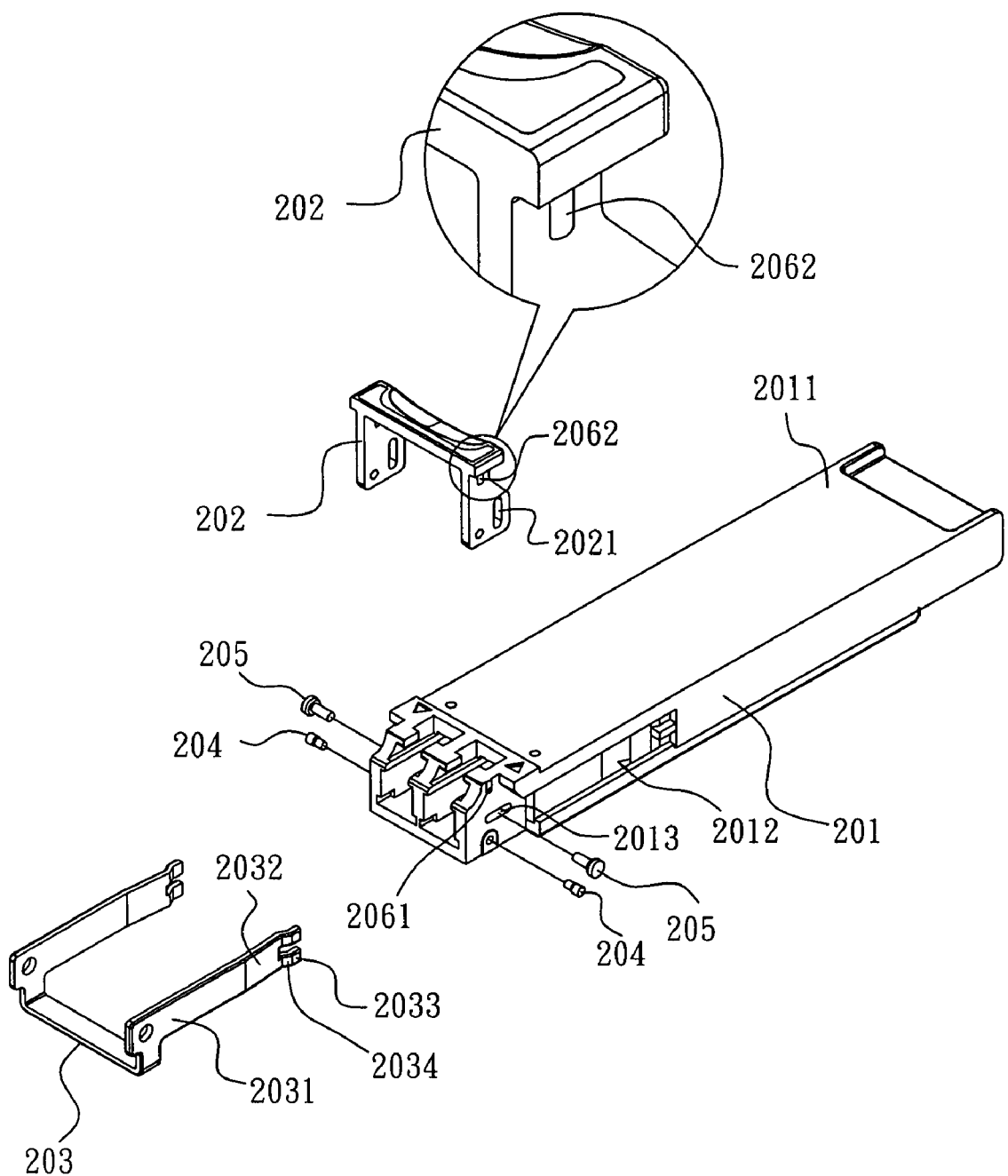
FIG. 4 is an exploded view of the optical transceiver of FIG. 3.

Referring to FIG. 4, the optical transceiver 20 includes a main body 201, a handle 202 and a sliding element 203. The main body 201 includes a case 2011, which accommodates some components with the light emitting/receiving function such as a light emitting device, a light detecting device, a driver/receiver circuitry module, and the like.

In the present embodiment, the handle 202 is U-shaped and is pivotally connected with the main body 201 by a first connecting member 204 such as a bolt. In this case, the material of the handle 202 can be plastic, metal, alloy, stainless steel, ceramic, and the like.

The sliding element 203 is secured to the handle 202 by a second connecting member 205. Also, the handle 202 has a first guiding slot 2021, and the main body 201 has a second guiding slot 2013 corresponding to the first guiding slot 2021. The second connecting member 205 passes through the first guiding slot 2021 and the second guiding slot 2013 so as to connect the sliding element 203 to the main body 201. In this case, the second connecting member 205 is a rivet, and the material of the sliding element 203 can be plastic, metal) alloy, stainless steel, ceramic, and the like.

Figure 10:
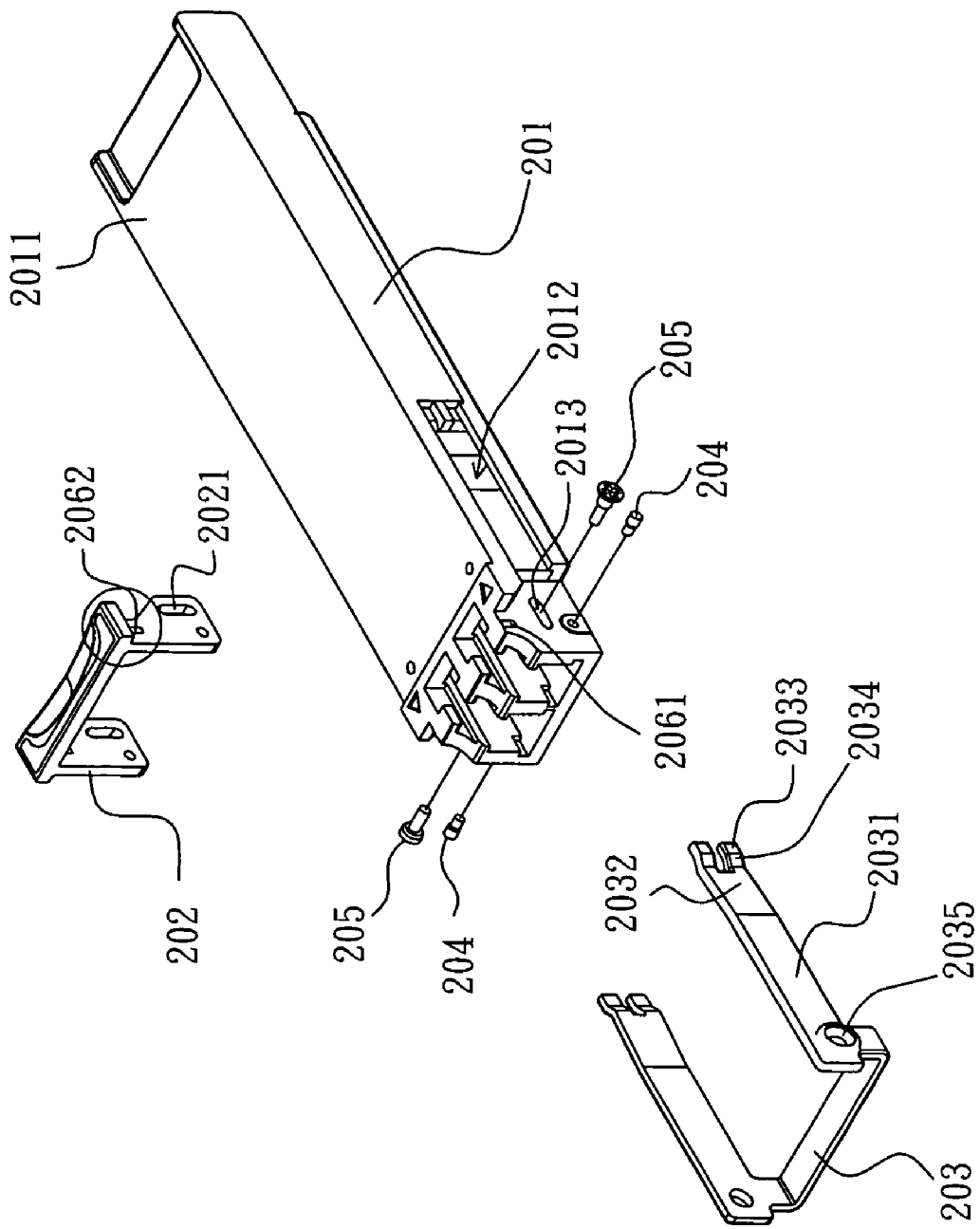
FIG. 10 is an exploded view of another optical transceiver according to a preferred embodiment of the invention.

In addition, the second connecting member 205 is not limited to the rivet, and other equivalents are also able to apply. Referring to FIG. 10, it is an exploded view of another optical transceiver according to a preferred embodiment of the invention. As shown in FIG. 10, the difference between FIG. 3 and FIG. 10 is that the second connecting member 205 in FIG. 10 is a screw, and the sliding element 203 further includes a protruded screw hole 2035. The other components with the same label number as FIG. 3 have the same construction and function as described above. The corresponding descriptions are omitted for concise purpose.

As shown in FIG. 10, when the sliding element 203, the handle 202 and the main body 201 are assembled, because the protruded screw hole 2035 of the sliding element 203 is disposed corresponding to the second connecting member 205, one end of the screw 205 passes through the first guiding slot 2021 of the handle 202 and the second guiding slot 2013 of the main body in turn, and the other end of the screw 205 is engaged with the protruded screw hole 2035 of the sliding element 203 by screwing, whereby the screw 205 being fixed on the sliding element 203 so as to connect the sliding element 203 to the main body 201.

Referring to FIGS. 3 and 4, the sliding element 203 includes two arms 2031, which are disposed in parallel. The main body 201 includes two tracks 2012 located at two opposite side surfaces thereof. The arms 2031 are slidably disposed in the tracks 2012, respectively. Each arm 2031 has a protrusion portion 2033 located at one end of the arm 2031 and a bent portion 2032, which is an inward turn corresponding to the track 2012. An inclined surface 2034 is located between the bent portion 2032 and the protrusion portion 2033. The protrusion portion 2033 is preferably a wedge-shaped block.

Figure 5:
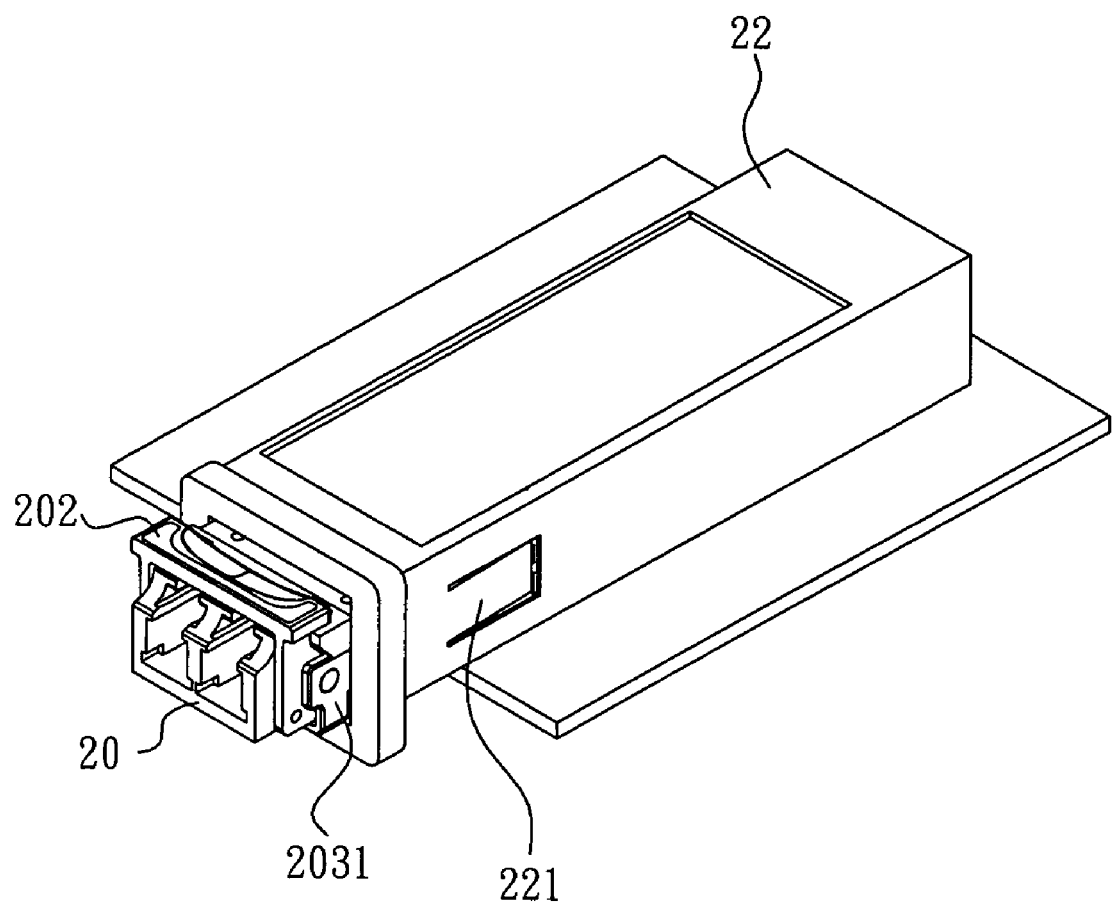
FIG. 5 is a schematic view showing that the optical transceiver is disposed within the cage according to a preferred embodiment of the invention.

As shown in FIG. 5, the cage 22 has two elastic elements 221 located at opposite side surfaces of the cage 22. The elastic element 221 is protruded inwardly corresponding to the bent portion 2032. When the optical transceiver 20 is disposed within and locked in the cage 22, the handle 202 is located substantially perpendicularly to the arm 2031, and the arm 2031 is exactly accommodated in the track 2012. Therefore, once the optical transceiver 20 is inserted into the cage 22, the elastic element 221 contacts the bent portion 2032 for positioning the optical transceiver 20 in the cage 22.

Moreover, with reference to FIG. 4 and FIG. 5, the main body 201 further includes a first position portion 2061, and the handle 202 further includes a second position portion 2062 corresponding to the first position portion 2061. When the first position portion 2061 contacts with the second position portion 2062, the handle 202 is positioned with respect to the main body 201 when the handle 202 is rotated. For example, the first position portion 2061 may be a protrusion while the second position portion 2062 may be a recess. Of course, the first position portion 2061 may be a recess while the second position portion 2062 may be a protrusion.

Figure 6:
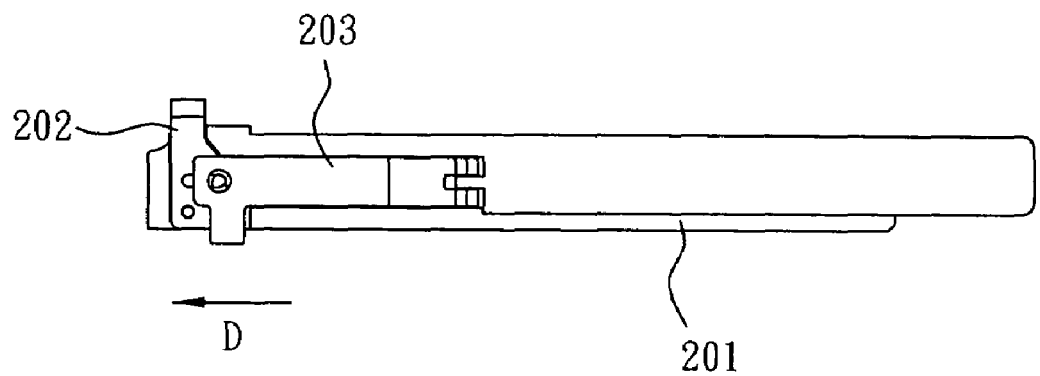
FIG. 6 to FIG. 9 are schematic views showing actions for releasing the optical transceiver from the cage.
Figure 7:
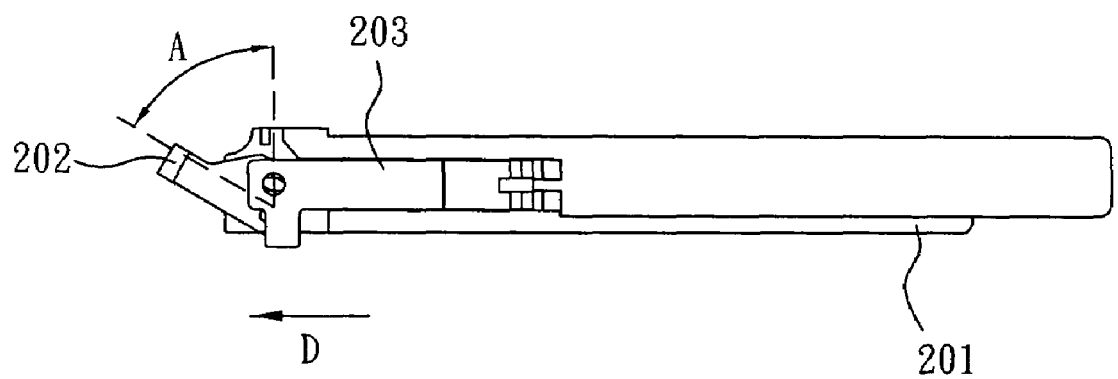
Figure 8:
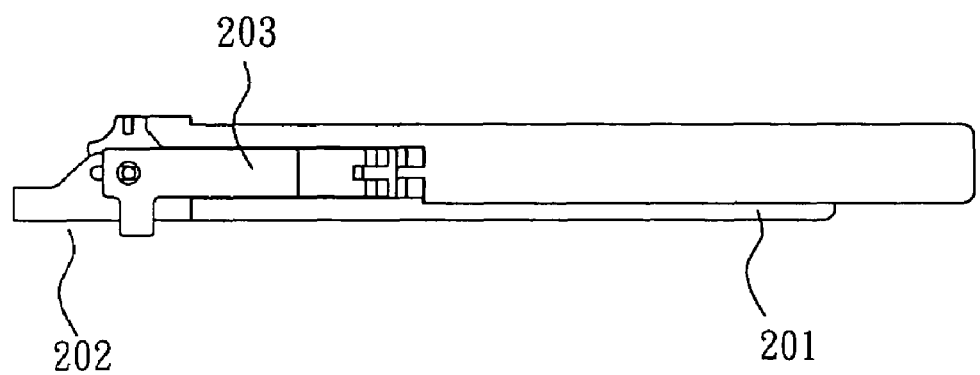
Figure 9:
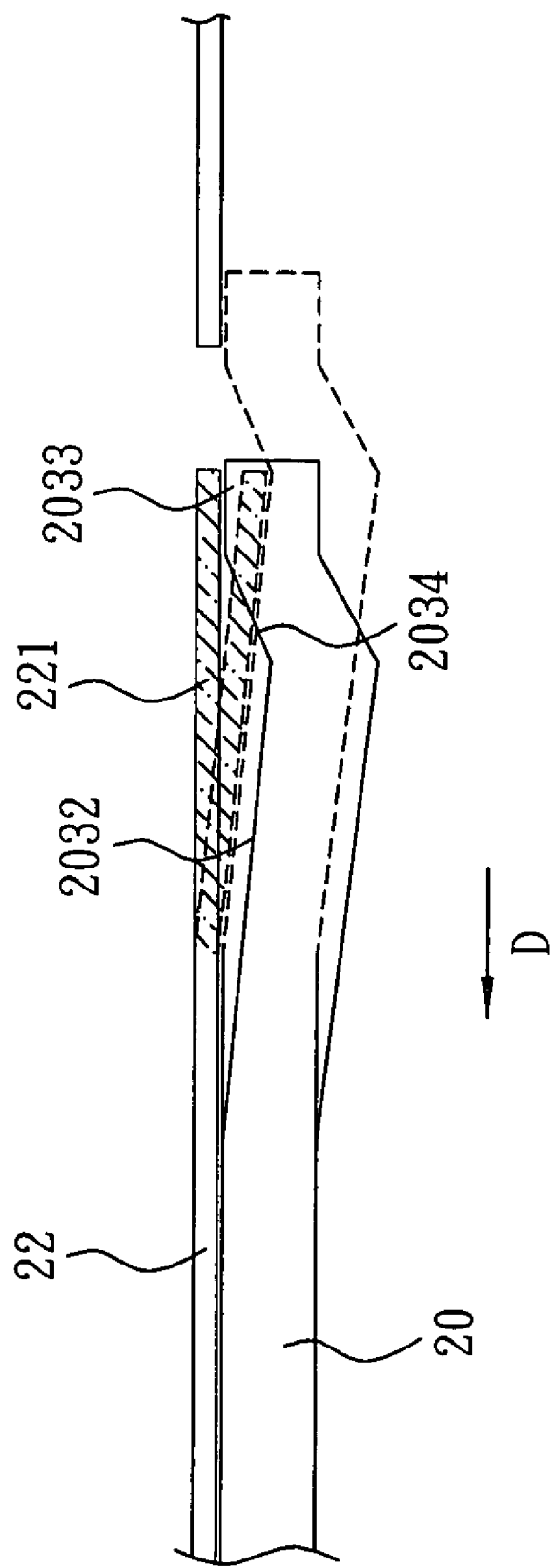

FIG. 6 to FIG. 9 are schematic views showing actions for releasing the optical transceiver 20 from the cage 22. As shown in FIG. 6, the handle 202 is pivotally connected with the main body 201, and the handle 202 and the main body 201 are substantially perpendicularly to each other, i.e. the optical transceiver 20 is in the locked state. As shown in FIGS. 7 and 8, when the handle 202 is rotated in an angle "A" by an external force, the sliding element 203 of the handle 202 relatively slides along a direction "D". At this moment, the elastic element 221 contacting against the bent portion 2032 is pushed by the protrusion portion 2033 to move along the inclined surface 2034. Then, the optical transceiver 20 is ejected out of the cage 22 and becomes to a released state from the locked state, as shown in FIG. 9.

In summary, the optical communication apparatus and optical transceiver of the invention utilize the handle, which is pivotally connected with the main body, to motivate the sliding element for releasing the optical transceiver from the cage. Accordingly, the optical transceiver can be locked in or ejected out of the cage based on the rotation of the handle. In the invention, the invention uses only one handle and one sliding element to hold the optical transceiver in/out the cage. Compared with the prior art, the invention has simpler components, so that the assembling labors and manufacturing and component managing costs can be reduced. In addition, the invention utilizes a mechanism to transform the optical transceiver between the locked state and the released state. Thus, the structure of the invention is securer, and the malfunction due to the elastic fatigue of the conventional elastic element can be prevented. As a result, the reliability of the products is improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical transceiver disposed within a cage having an elastic element, comprising:
   a main body;
   a handle coupled with the main body; and
   a sliding element secured to the handle and having an arm, wherein the arm urges against the elastic element and is slidably disposed in a track of the main body when the main body is inserted in the cage, and when the handle is rotated forward, the sliding element simultaneously slides forward to release the arm from the elastic element of the cage,
   wherein the arm has a bent portion, the elastic element of the cage urges against the bent portion when the main body is inserted in the cage, so as to assemble the optical transceiver and the cage, and when the handle is rotated forward, the sliding element simultaneously slides forward to release the bent portion of the arm from the elastic element of the cage.

2. The optical transceiver of claim 1, wherein the arm has a protrusion portion located at one end of the arm, and an inclined surface is disposed between the bent portion and the protrusion portion.

3. The optical transceiver of claim 2, wherein the protrusion portion is wedge-shaped.

4. The optical transceiver of claim 1, wherein the main body further has a first position portion, and the handle has a second position portion for engaging with the first position portion so that the handle is positioned with respect to the main body when the optical transceiver is received in the cage and the handle is rotated backward.

5. The optical transceiver of claim 1, wherein the handle has at least one end pivotally connected to the main body by a first connecting member.

6. The optical transceiver of claim 5, wherein the first connecting member is a bolt.

7. The optical transceiver of claim 1, wherein the handle has a first guiding slot, the main body has a second guiding slot, the sliding element has a second connecting member passing through the first guiding slot and the second guiding slot so as to connect the sliding element to the main body, and the handle is pivotally connected to the main body on a pivot point below the first and second guiding slots, whereby when the handle is rotated forward, the sliding element slides forward simultaneously.

8. The optical transceiver of claim 7, wherein the second connecting member is a rivet or a screw.

9. The optical transceiver of claim 1, wherein the handle and/or the sliding element comprises plastic, metal, alloy, stainless steel, or ceramic.

10. The optical transceiver of claim 1, wherein the optical transceiver is applied to an optical communication apparatus and the cage is connected with a circuit board of the optical communication apparatus.

11. The optical transceiver of claim 1, wherein the optical transceiver is disposed within the cage by being flexibly plugged/unplugged thereto.

12. The optical transceiver of claim 1, wherein when the handle is pushed away from the cage, the sliding element slides away from the cage and pushes the elastic element upwardly to allow the transceiver to be ejected from the cage.

13. An optical communication apparatus, comprising:
    a circuit board;
    a cage having an elastic element and connecting with the circuit board; and
    an optical transceiver disposed within the cage, wherein the optical transceiver comprises a main body, a handle and a sliding element, the handle is coupled with the main body, and the sliding element is secured to the handle and has an arm urging against the elastic element and slidably disposed in a track of the main body when the main body is inserted in the cage, and when the handle is rotated forward, the sliding element simultaneously slides forward to release the arm from the elastic element of the cage,
    wherein the arm has a bent portion, and the elastic element of the cage urges against the bent portion when the main body is inserted in the cage, so as to assemble the optical transceiver and the cage, and when the handle is rotated forward, the sliding element simultaneously slides forward to release the bent portion of the arm from the elastic element of the cage.

14. The optical communication apparatus of claim 13, wherein the arm has a protrusion portion located at one end of the arm, and an inclined surface is disposed between the bent portion and the protrusion portion.

15. The optical communication apparatus of claim 14, wherein the protrusion portion is wedge-shaped.

16. The optical communication apparatus of claim 13, wherein the main body further has a first position portion, and the handle has a second position portion for engaging with the first position portion so that the handle is positioned with respect to the main body when the optical transceiver is received in the cage and the handle is rotated backward.

17. The optical communication apparatus of claim 13, wherein the handle has at least one end pivotally connected to the main body by a first connecting member.

18. The optical communication apparatus of claim 17, wherein the first connecting member is a bolt.

19. The optical transceiver of claim 13, wherein the handle has a first guiding slot, the main body has a second guiding slot, the sliding element has a second connecting member passing through the first guiding slot and the second guiding slot so as to connect the sliding element to the main body, and the handle is pivotally connected to the main body on a pivot point below the first and second guiding slots, whereby when the handle is rotated forward, the sliding element slides forward simultaneously.

20. The optical communication apparatus of claim 13, wherein when the handle is pushed away from the cage, the sliding element slides away from the cage and pushes the elastic element upwardly to allow the transceiver to be ejected from the cage.

21. An optical transceiver disposed within a cage having an elastic element, comprising:
    a main body;
    a handle coupled with the main body; and
    a sliding element secured to the handle and having an arm, wherein the arm urges against the elastic element and is slidably disposed in a track of the main body when the main body is inserted in the cage, and when the handle is rotated forward, the sliding element simultaneously slides forward to release the arm from the elastic element of the cage,
    wherein the main body further has a first position portion, and the handle has a second position portion for engaging with the first position portion so that the handle is positioned with respect to the main body when the optical transceiver is received in the cage and the handle is rotated backward.

* * * * *